United States Patent [19]
Stanley

[11] Patent Number: 5,890,955
[45] Date of Patent: Apr. 6, 1999

[54] ZERO TIME CLIPPER ROLLER CONVEYOR

[75] Inventor: Thomas Ralph Stanley, Danville, Ill.

[73] Assignee: Teepak Investments, Inc., Wilmington, Del.

[21] Appl. No.: 922,816

[22] Filed: Sep. 3, 1997

Related U.S. Application Data

[63] Continuation-in-part of Ser. No. 520,583, Aug. 29, 1995, abandoned.

[51] Int. Cl.$^6$ .................................................. A22C 11/02
[52] U.S. Cl. ............................................................ 452/48
[58] Field of Search ................................. 452/46, 48, 47

[56] References Cited

U.S. PATENT DOCUMENTS

| | | |
|---|---|---|
| 3,975,795 | 8/1976 | Kupcikevicius et al. . |
| 4,017,941 | 4/1977 | Raudys et al. .............................. 452/48 |
| 4,044,426 | 8/1977 | Kupcikevicius et al. . |
| 4,073,039 | 2/1978 | Müller et al. . |
| 4,129,923 | 12/1978 | Hoegger . |
| 4,438,545 | 3/1984 | Kupcikevicius et al. . |
| 4,773,128 | 9/1988 | Stanley et al. ............................. 452/48 |
| 4,796,332 | 1/1989 | Stanley ....................................... 452/48 |
| 4,847,951 | 7/1989 | Kollross . |
| 5,156,566 | 10/1992 | Righele ..................................... 452/46 |

FOREIGN PATENT DOCUMENTS 9201169  1/1994  Netherlands .
90/05671  5/1990  WIPO .

Primary Examiner—Willis Little
Attorney, Agent, or Firm—Michael L. Dunn

[57] ABSTRACT

A method for stuffing food product into a tubular food casing by continuously filling a tubular food casing to obtain a predetermined linear rate of movement of stuffed food product; moving a closing device with the food casing at said predetermined linear rate of movement; activating said closing device to apply a closure in the form of a tie or clip to segregate the stuffed food product into links while the stuffed food product continues to move at the predetermined rate; and supporting the filled food casing during the filling and closing by means of a roller table comprising indented rollers and upon which the filled food casing rests, the roller table being provided with opposing link side supports containing bearings which support the rollers and which permit the rollers to freely rotate. The roller table lacks a roller directly beneath the closing device to form a space which permits closing of the food casing. The link side supports move in the direction of movement and at the speed of the closing device so that the space stays beneath the closing device at all times during its motion and so that the rollers move in the direction and speed of the closing device. The invention further includes a machine for practicing the method.

10 Claims, 5 Drawing Sheets

ZERO TIME CLIPPER ROLLER CONVEYOR

This is a continuation-in-part of U.S. patent application Ser. No. 08/520,583, filed Aug. 29, 1995 abandoned.

BACKGROUND OF THE INVENTION

This invention relates to stuffing of tubular food casing with food product and more particularly relates to a method and apparatus for efficiently applying clips or ties to stuffed food product for separation into discrete "links."

It has been known that food product stuffed into tubular food casing can be separated into discrete links by means of ties or clips. Unfortunately such linking has been an inefficient operation since in order to apply a tie or clip the stuffing operation has to be momentarily stopped. This has had a number of disadvantages. In particular the repeated starting and stopping of the stuffing operation is time consuming thus slowing the stuffing process. In addition food product is supplied to the casing by means of a food product pump which must be repeatedly turned on and off as the stuffing operation starts and stops. This is not only hard on the pump but creates pressure surges of food product which contributes to a non-uniform diameter in the finished stuffed product.

Attempts have been made to apply closures as the stuffed food product continues to move, e.g., as described in WO-A-9005671 and NL-A-9201169. These publications described complex mechanisms requiring numerous closing devices. Another problem associated with such devices is a non uniformity resulting from friction of stuffed food product with conveying or holding mechanisms.

It is therefore an object of the present invention to provide a method and apparatus which permits improved production rate for stuffed tubular food casing and which permits the production of product having a more uniform stuffed diameter, using a single closing device.

BRIEF DESCRIPTION OF THE INVENTION

In accordance with the invention there is therefore provided a method for stuffing food product into a tubular food casing by continuously filling a tubular food casing to obtain a predetermined linear rate of movement of stuffed food product; moving a closing device with the food casing at said predetermined linear rate of movement; activating the closing device to apply a closure in the form of a tie or clip to segregate the stuffed food product into links while the stuffed food product continues to move at the predetermined rate; and supporting the filled food casing during the filling and closing by means of a roller table comprising indented rollers and upon which the filled food casing rests, the roller table being provided with opposing link side supports containing bearings which support the rollers and which permit the rollers to freely rotate. The roller table lacks a roller directly beneath the closing device to form a space which permits closing of the food casing. The link side supports move in the direction of movement and at the speed of the closing device so that the space stays beneath the closing device at all times during its motion and so that the rollers move in the direction and speed of the closing device.

The invention also includes an improved food product stuffing machine which stuffs food product into a tubular food casing which comprises a means for continuously stuffing the food product into the tubular casing so as to obtain a predetermined linear rate of continuous movement of stuffed food product; a closing device which can apply a closure in the form of a clip or tie to the stuffed food product; means for moving said closing device with said stuffed food product at said predetermined linear rate; means for activating said closing device to apply a clip or tie to the stuffed food product to segregate the stuffed food product into stuffed food product links while the stuffed food product continues to move at said predetermined rate; and means for supporting said filled food casing during said filling and closing by means of a roller table comprising indented rollers and upon which the filled food casing rests, said roller table being provided with opposing link side supports containing bearings which support the rollers and which permit the rollers to freely rotate, said roller table lacking a roller directly beneath the closing device to form a space which permits closing of the food casing, said link side supports moving in the direction of movement and at the speed of the closing device so that the space stays beneath the closing device at all times during its motion and so that the rollers move in the direction and speed of the closing device. After clipping, means is provided for returning the closing device along its original path to an original position to repeat the operation after another desired length of casing is stuffed.

In accordance with the present invention, the closures are usually, but not essentially, clips and the food product is usually, but not essentially, sausage product. When the term "sausage" or "sausage casing" are used herein, it is to be understood that the invention also applies to other stuffable "foodstuffs" within "food casings."

When the apparatus of the invention uses clips as the closing means, the apparatus includes a clipping mechanism which moves from a starting position with the stuffed sausage product at said predetermined rate during application of a clip to the sausage product and includes means for returning the clipping mechanism along the same path to the starting position after the clip is applied.

In a preferred embodiment, the clipping mechanism comprises a first V shaped jaw and a second V shaped jaw which move toward each other to compress and narrow the stuffed sausage product in preparation for application of a clip and also comprises a means for applying a U shaped clip over the narrowed portion of the stuffed sausage product followed by bending legs of the clip to retain and segregate sausage links.

DETAILED DESCRIPTION OF THE INVENTION

Figure 1:
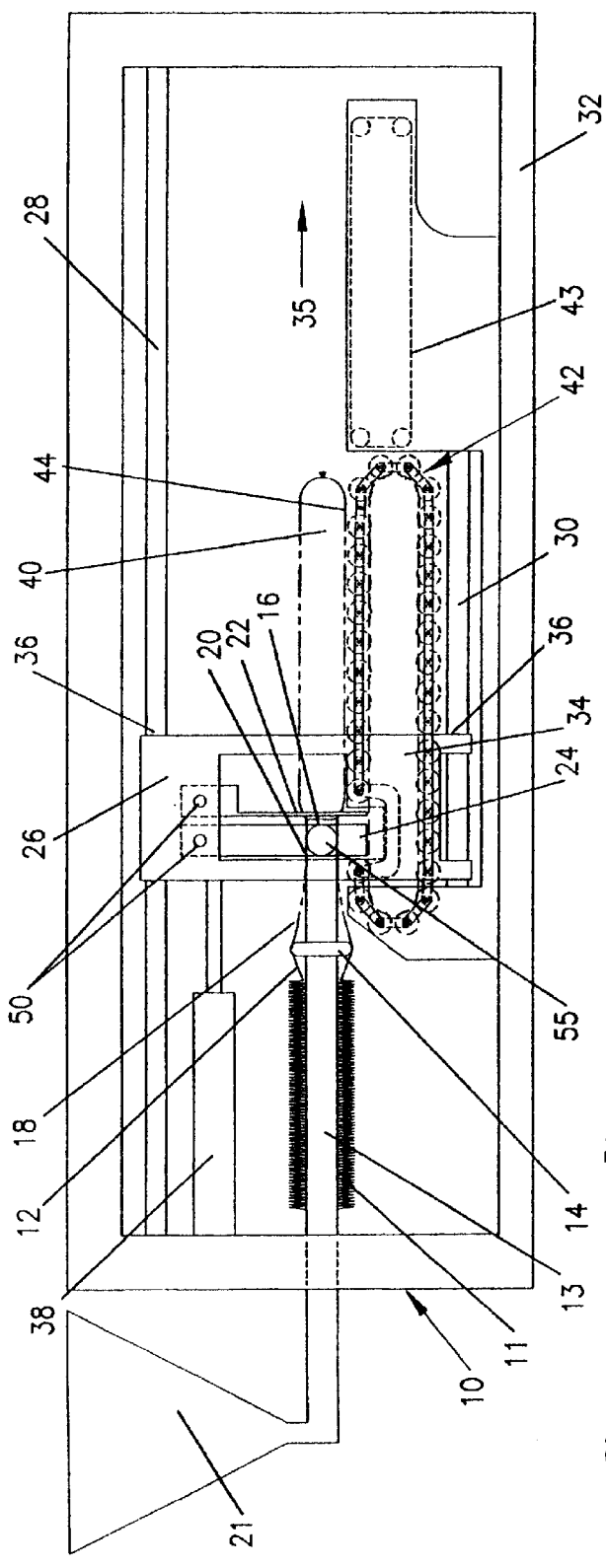
FIG. 1 is a side cross-sectional view of the machine of the invention showing the roller conveyor table and closing and clipping devices at a first position proximate the end of the stuffing horn wherein the closing and clipping devices are open.
Figure 2:
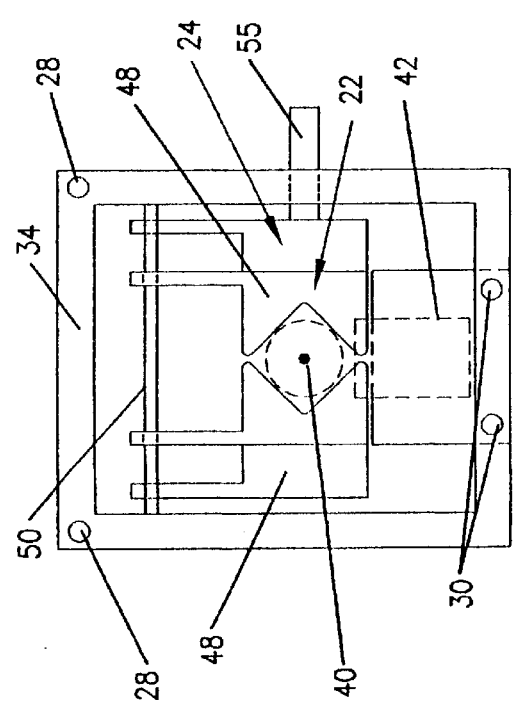
FIG. 2 is a right end view of the apparatus shown in FIG. 1.
Figure 3:
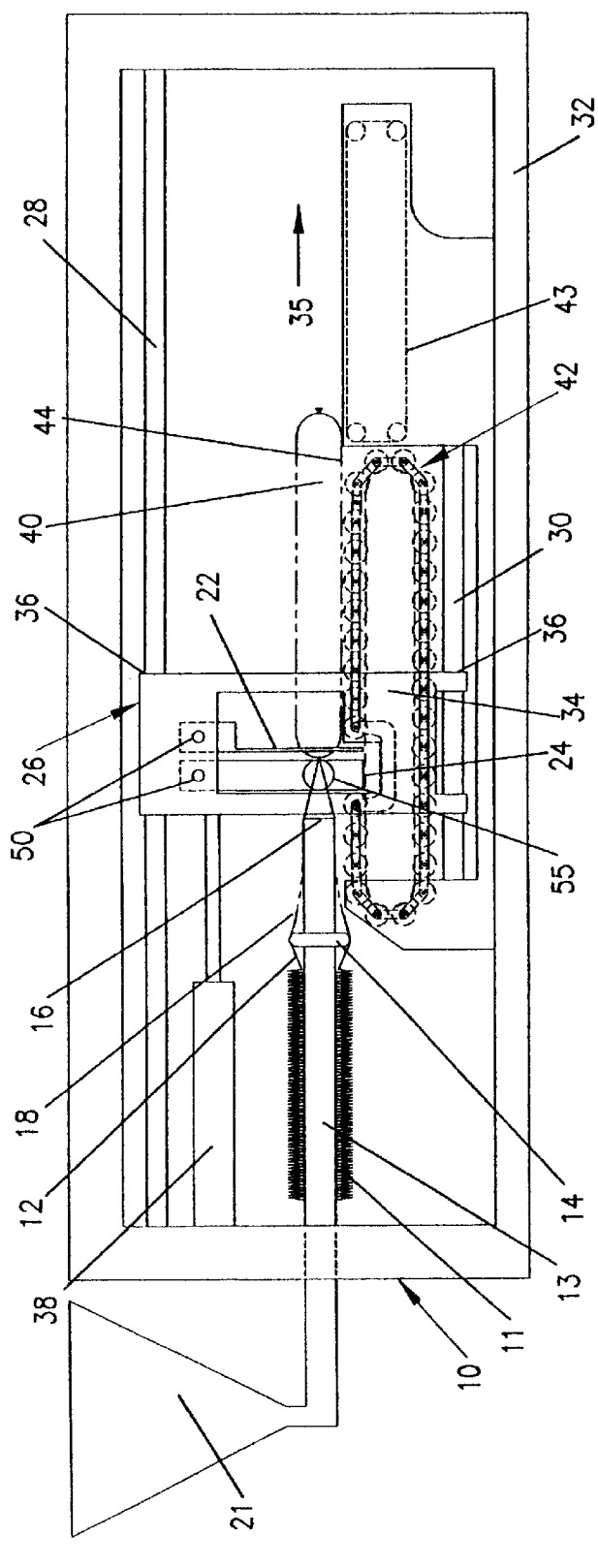
FIG. 3 is a side cross-sectional view of the machine of FIG. 1 wherein the closing and clipping mechanisms are in a second position further from the stuffing horn than in FIG. 1 wherein the closing mechanism is closed upon the casing.
Figure 4:
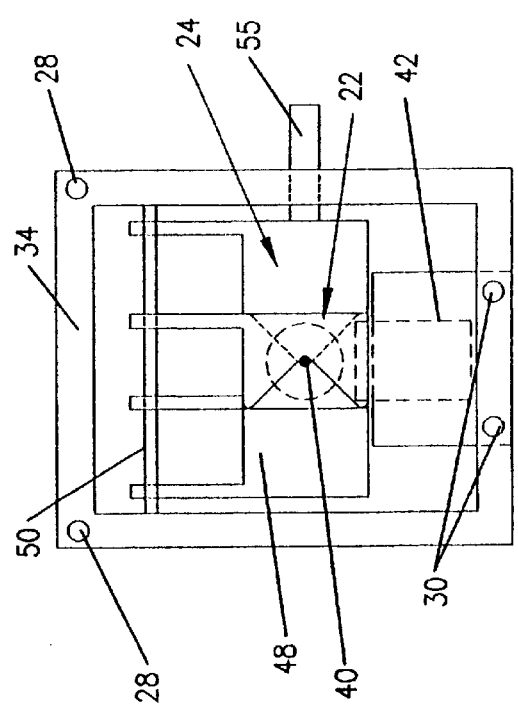
FIG. 4 is a right end view of the machine shown in FIG. 3.
Figure 5:
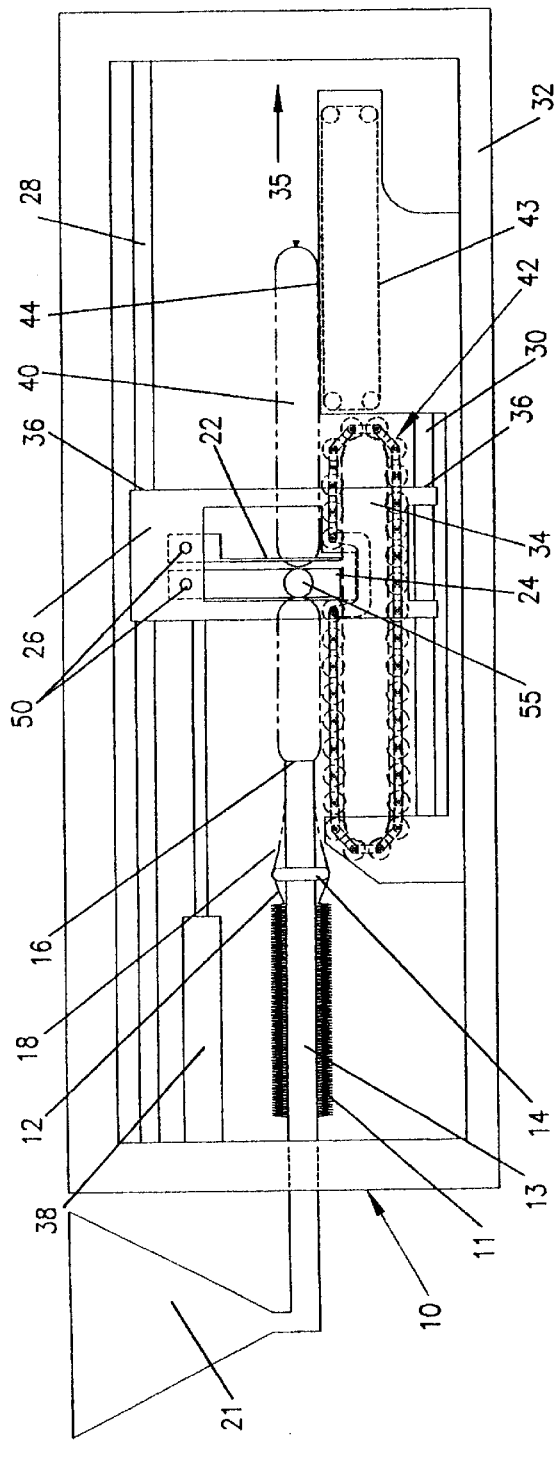
FIG. 5 is a side cross-sectional view of the machine of FIG. 3 wherein the closing and clipping mechanisms are in a third position still further from the stuffing horn than in FIG. 3 wherein the closing mechanism is closed and the clipping mechanism has been actuated.
Figure 6:
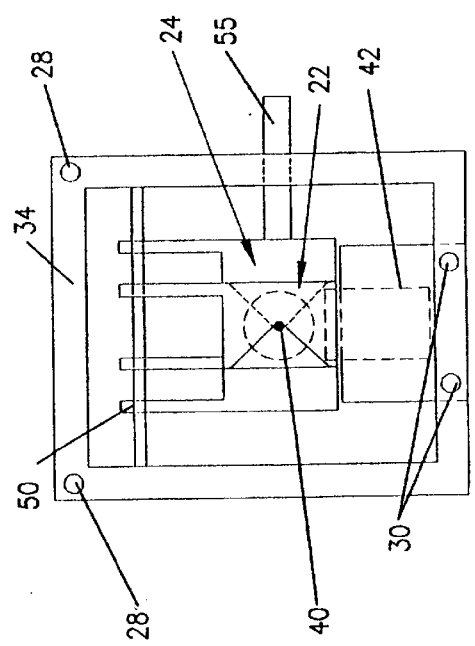
FIG. 6 is an end view of the machine of FIG. 5.

"Food product" as used herein means essentially any food which can be stuffed into a tubular film casing. The most common of such foods are sausage meats, e.g. frankfurters, bologna, salami, Italian sausage, Polish sausage, knockwurst, bratwurst, liver sausage, summer sausage, etc. Other foods also can be stuffed into such casings, e.g. fish paste, turkey breast, whole and processed ham, cheeses, processed chicken, etc.

"Stuffed" means to be introduced into a tubular film casing. Such stuffing may be accomplished by any suitable means which usually involves passing the food product through a stuffing horn upon which tubular film casing has been placed.

"Tubular film casing" means a film in the form of a tube or hose. Such tubular films may be originally extruded in a tubular form or may be later formed from a flat film by sealing opposing edges of a flat film. The film used to form the casing may be any suitable film such as regenerated cellulose, collagen, and plastic, any of which may optionally be reinforced with fibers, e.g. a non-woven cellulose fiber paper.

"Continuously" means without stopping, except for purposes of resupplying food product or tubular film casing, if required.

"Stuffed food product" means the product resulting from stuffing the food product into a tubular film casing.

"Predetermined linear rate" means an essentially constant continuous throughput of finished stuffed food product.

"Closing the stuffed food product" means to tie, clip or otherwise secure the end of the tubular food casing, at the end into which stuffing took place, after stuffing to retain the food product within the casing and to form segregated "links".

The means for moving the closing device with the stuffed food product and returning it may be any suitable means such as a carriage operated by a servo motor, or a series of gears, belts or chains and sprockets.

The invention may be better understood by reference to the drawings which illustrate a preferred embodiment of the machine of the invention for practicing the method of the invention.

The drawings illustrate a preferred embodiment of a machine 10 of the invention. Referring to the drawings, a shirred stick 11 of tubular food casing 12 is placed over a stuffing horn 13 and a sizing ring 14 is then placed over an end 16 of the stuffing horn 13 after a section 18 of casing 12 is pulled from the shirred stick 11.

The open end 20 of section 18 is then closed by gathering casing 12 at the end by means of gathering mechanism 22 and applying a clip by means of clipping mechanism 24.

Gathering mechanism 22 and clipping mechanism 24 are secured to horizontal transport 26 and are slidably mounted on shafts 50. Horizontal transport 26 comprises upper horizontal guide rods 28, and lower horizontal guide rods 30, all of which are secured to frame 32 of the machine. Transport 26 also comprises carriage 34 which rides upon upper and lower guide rods 28 and 30 using slide bearings 36. Carriage 34 is moved in both directions along the guide rods by means of servo motor 38.

After the end of casing 12 is clipped food product is passed through stuffing horn 13 at a rate which is controlled by a food pump 21. As a result food casing 12 is drawn from stick 11 to form stuffed food product 40 which moves at a linear rate matched to the entry of sufficient food into the casing for stuffing.

After a desired length of food casing is stuffed, carriage 34 is moved in the direction of movement 35 of stuffed food product at a rate which matches the linear rate of movement of stuffed food product. As the carriage moves, the casing is gathered and clipped by the carried gathering and clipping mechanisms 22 and 24 at the desired location for closing the casing to form a finished "link" of stuffed food product. The gathering and clipping thus occurs without interrupting the flow of food product or slowing the rate of movement of stuffed food product.

As soon as the clipping is complete, the servo motor reverses and returns the carriage 34, with carried gathering and clipping mechanisms, so that the mechanisms are positioned to again activate when a desired closing position on the stuffed food product reaches the mechanisms.

As can also be seen in the drawings, stuffed food product is carried by roller conveyor table 42, as it is formed at the end of the stuffing horn. Since the gathering and clipping mechanisms partly operate at a level below a bottom edge 44 of stuffed food product, the roller conveyor table of the preferred embodiment is unique in that it has a gap in the area of the gathering and clipping mechanisms. This is particularly interesting in that the portion of the roller conveyor with the gap moves as the gathering and clipping mechanisms move. This is accomplished by securing the roller conveyor to carriage 34 such that as the carriage is moved, the gap is always below the bottom edge 44 in the area of the gathering and clipping mechanisms.

The gathering mechanism attached to the carriage, in a preferred embodiment, comprises opposing gathering shutters which have V shaped grooves which gather the casing into a tight area as the gathering shutters 48 move toward each other. The gathering shutters are moved toward each other by any suitable means such as one or more air operated pistons or servo motors.

After gathering a clip punch comprising cylinder 55 moves a U shaped clip around the gathered casing and against a die which bends legs of the clip thus securing it to the casing. The clip punch may also be operated by any suitable means such as an air actuated piston.

In operation, after the first clip is placed on end 20 of the casing, food product flows from the stuffing horn into the casing to form stuffed food product which is carried from the stuffing horn at a predetermined rate by means of roller conveyor table 42. After a desired length of stuffed food product is made, carriage 34 moves in the direction of travel of the stuffed food product at a location along the stuffed food product where a clip is desired. As the carriage moves, gathering shutters 48 move toward each other to gather the casing in preparation for receipt of a clip. Subsequent to gathering, a clip punch, carrying a clip, places the clip around the gathered casing and impinges the clip upon a die which folds the clip around and secures it to, the gathered casing.

Figure 7:
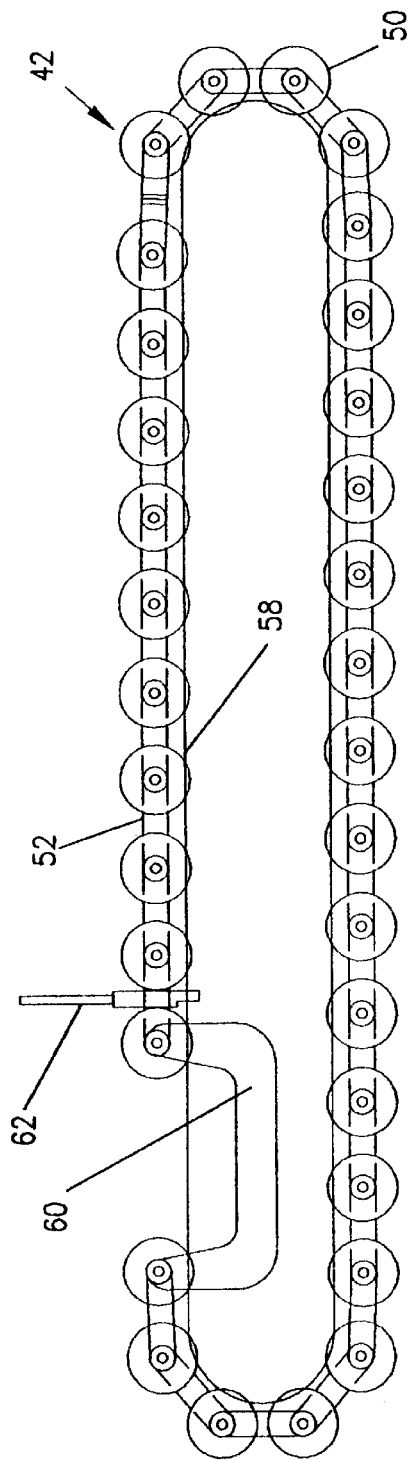
FIG. 7 is a side view of an embodiment of the roller conveyor table of the invention.
Figure 8:
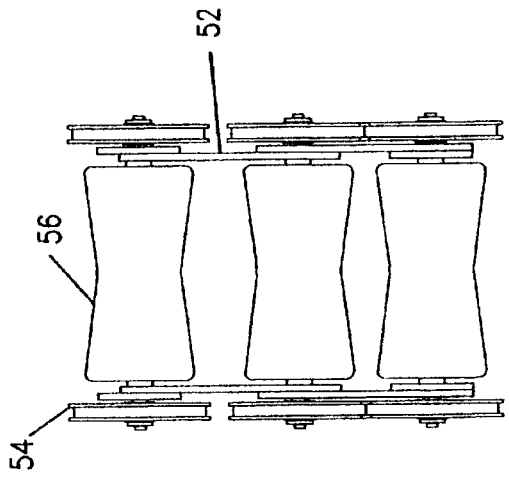
FIG. 8 is an end view of the conveyor of FIG. 7.
Figure 9:
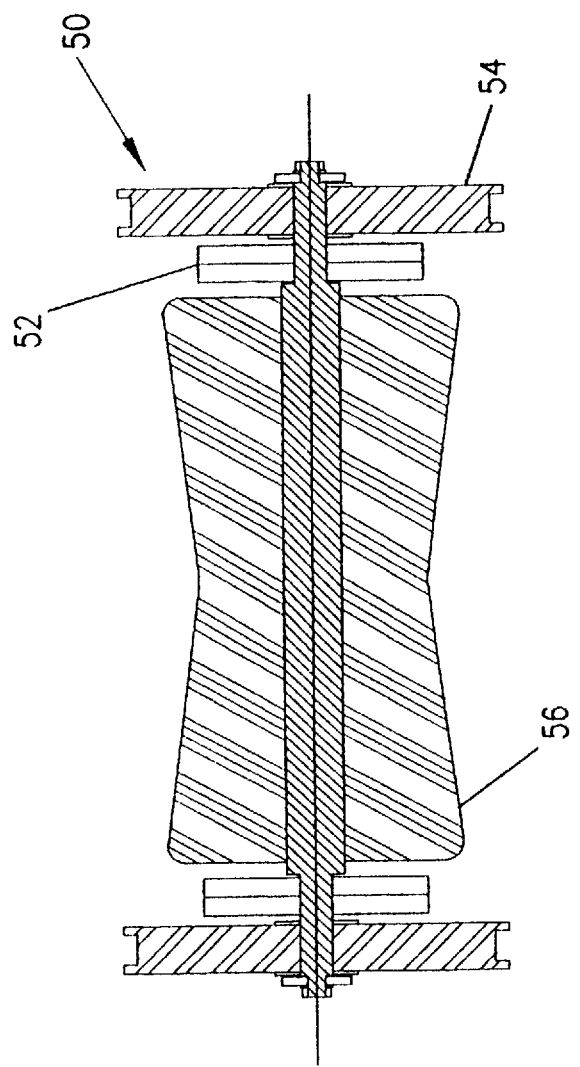
FIG. 9 is a cross-sectional view of a roller in the roller conveyor of FIG. 7.

FIGS. 7, 8 and 9 show roller conveyor table 42 having rollers 50 connected together by means of links 52. Rollers 50 are complex rollers in that they each comprise guide rollers 54 and a chub roller 56. Guide rollers 54 roll along dual parallel spaced tracks 58 and keep the roller conveyor 42 aligned and supported. Chub rollers 56 are free wheeling and thus offer almost no resistance to outward movement of stuffed food product as it leaves the stuffing horn thus frictional resistance of stuffed food product does not cause non-uniform stuffing.

Clipper connecting link 60 permits the elimination of a roller beneath the clipper so that the gathering and clipping mechanism can simultaneously contact stuffed food product from opposing directions. A connecting bar 62 is provided so that the track rollers 56 move at the speed of the gathering and clipping mechanisms and so that the connecting link stays aligned with them at all times. Action by the gathering and clipping mechanisms is thus never impaired by rollers 50.

The method and apparatus of the invention overcomes the previously discussed disadvantages associated with closing links of stuffed food product. For example, it is not necessary to stop the stuffing operation to close the casing to form links thus production rate is increased. It is not necessary to stop and start a pump for food product thus saving wear on the pump and food product surges are reduced or eliminated thus resulting in a more uniform product. Further frictional resistance to stuffed food product is practically eliminated so that lack of uniformity of sizing due to frictional resistance is overcome.

In a time comparison, the apparatus of the present invention will stuff links or chubs over thirty percent faster than the present state-of-the-art commercial "T-SIZER" stuffing machine without even considering less down time due to extended pump life.

what is claimed is:

1. A method for stuffing food product into a tubular food casing which comprises:

a) continuously filling a tubular food casing to obtain a predetermined linear rate of movement of stuffed food product;

b) moving a closing device with said food casing at said predetermined linear rate of movement;

c) activating said closing device to apply a closure in the form of a tie or clip to segregate the stuffed food product into links while the stuffed food product continues to move at said predetermined rate; and d) supporting said filled food casing during said filling and closing by means of a roller table comprising indented rollers and upon which the filled food casing rests, said roller table being provided with opposing link side supports containing bearings which support the rollers and which permit the rollers to freely rotate, said roller table lacking a roller directly beneath the closing device to form a space which permits closing of the food casing, said link side supports moving in the direction of movement and at the speed of the closing device so that the space stays beneath the closing device at all times during its motion and so that the rollers move in the direction and speed of the closing device.

2. An improved food product stuffing machine which stuffs food product into a tubular food casing which comprises:

means for continuously stuffing the food product into the tubular casing so as to obtain a predetermined linear rate of continuous movement of stuffed food product;

a closing device which can apply a closure in the form of a clip or tie to the stuffed food product;

means for moving said closing device with said stuffed food product at said predetermined linear rate;

means for activating said closing device to apply a clip or tie to the stuffed food product to segregate the stuffed food product into stuffed food product links while the stuffed food product continues to move at said predetermined rate; and means for supporting said filled food casing during said filling and closing by means of a roller table comprising indented rollers and upon which the filled food casing rests, said roller table being provided with opposing link side supports containing bearings which support the rollers and which permit the rollers to freely rotate, said roller table lacking a roller directly beneath the closing device to form a space which permits closing of the food casing, said link side supports moving in the direction of movement and at the speed of the closing device so that the space stays beneath the closing device at all times during its motion and so that the rollers move in the direction and speed of the closing device.

3. The machine of claim 2 wherein the closing device is a clipping device which applies clips to the stuffed food product.

4. The machine of claim 3 wherein the clipping device comprises a clipping mechanism which moves with the space from a starting position with the stuffed sausage product at said predetermined rate during application of a clip to the sausage product.

5. The machine of claim 4 wherein means is provided for returning the clipping mechanism and the space to the starting position after the clip is applied.

6. The machine of claim 4 wherein the clipping mechanism comprises a first V shaped jaw and a second V shaped jaw which move toward each other to compress and narrow the stuffed sausage product in preparation for application of a clip, at least one of said V shaped jaws at least partially moving within said space.

7. The machine of claim 6 wherein the clipping mechanism further comprises a means for applying a U shaped clip over the narrowed portion of the stuffed sausage product followed by bending legs of the clip to retain and segregate sausage links.

8. The machine of claim 2 wherein means is provided for returning the closing mechanism to a starting location, after said food casing is closed.

9. The machine of claim 8 wherein the means for moving the closing mechanism and space at the predetermined rate and the means for returning the closing mechanism and space to a starting location each comprise the same servo motor.

10. The machine of claim 2 wherein the means for moving the stuffed food product comprises a belt conveyor.

* * * * *